United States Patent [19]
Hanseder

[11] Patent Number: 6,108,076
[45] Date of Patent: Aug. 22, 2000

[54] METHOD AND APPARATUS FOR ACCURATELY POSITIONING A TOOL ON A MOBILE MACHINE USING ON-BOARD LASER AND POSITIONING SYSTEM

[75] Inventor: Anthony Hanseder, Santa Clara, Calif.

[73] Assignee: Trimble Navigation Limited, Sunnyvale, Calif.

[21] Appl. No.: 09/216,544

[22] Filed: Dec. 21, 1998

[51] Int. Cl.$^7$ .............................. G01B 11/26; G01C 3/08; G01C 9/00; E02F 3/76
[52] U.S. Cl. ...................... 356/141.1; 172/4.5; 356/4.01; 702/167; 702/152
[58] Field of Search ................................ 356/141.1, 4.08, 356/4.01; 172/4.5; 702/152, 167

[56] References Cited

U.S. PATENT DOCUMENTS

| | | |
|---|---|---|
| 3,815,250 | 6/1974 | Roodvoets et al. . |
| 4,221,483 | 9/1980 | Rando . |
| 4,225,226 | 9/1980 | Davidson et al. . |
| 4,231,700 | 11/1980 | Studebaker . |
| 4,355,895 | 10/1982 | Cairns et al. . |
| 4,600,997 | 7/1986 | Cain et al. . |
| 4,653,910 | 3/1987 | Poling . |
| 4,674,870 | 6/1987 | Cain et al. . |
| 4,676,634 | 6/1987 | Petersen . |
| 4,732,471 | 3/1988 | Cain et al. . |
| 4,733,355 | 3/1988 | Davidson et al. . |

(List continued on next page.)

FOREIGN PATENT DOCUMENTS

| | | |
|---|---|---|
| 0219767 | 4/1987 | European Pat. Off. . |
| 0223043 | 5/1987 | European Pat. Off. . |
| 0257525 | 3/1988 | European Pat. Off. . |
| 0262764 | 4/1988 | European Pat. Off. . |
| 0346043 | 12/1989 | European Pat. Off. . |
| 0346044 | 12/1989 | European Pat. Off. . |
| 0349132 | 1/1990 | European Pat. Off. . |
| 0358368 | 3/1990 | European Pat. Off. . |
| 0369694 | 5/1990 | European Pat. Off. . |
| 0405725 | 1/1991 | European Pat. Off. . |
| 0426287 | 5/1991 | European Pat. Off. . |

(List continued on next page.)

OTHER PUBLICATIONS

Brown, Steve, "Automatic Excavator Control. Laser Technology Enables Excavator Operators to Obtain Fast, Pinpoint Control of Slope, Depth and Material Placement," *Equipment Today*, Jun. 1998, pp. 16–18.

Ries, Richard, "Topcon in 3–D", *Equipment World*, Mar. 1998, p. 27.

Moore, Walt, "Grade–Control System Creates Virtual Stringline: Topcon's New System is aimed at Improving Productivity by Eliminating Staking and Checking", *Construction Equipment*, Mar. 1998, vol. 97, No. 3, pp. 105.

*Primary Examiner*—Stephen C. Buczinski
*Attorney, Agent, or Firm*—Blakely, Sokoloff, Taylor & Zafman LLP

[57] ABSTRACT

A method and apparatus for accurately positioning a tool on a mobile machine are provided. The machine is equipped with a satellite positioning system (SPS) receiver, a robotic total station with an integrated scanning laser and a storage facility storing a digital terrain model (DTM) of a work area. The machine operates within the work area and a number of stationary reflectors are positioned at various locations about the work area. The SPS receiver determines the current location of the machine. A system controller then references the DTM to determine the closest stationary reflector to the current location of the machine. Location data of the closest reflector is then provided to the robotic total station, which locates the closest reflector. The scanning laser then locks on to the reflector and the system controller determines the angle between the laser and the reflector. Based upon a computed angle, a displacement between the actual elevation of the machine and the design elevation for the current location of the machine is computed. The position of the tool is then adjusted based upon the computed displacement. If the closest reflector is out of range or obstructed by another object, the onboard system automatically determines the next closest reflector.

54 Claims, 6 Drawing Sheets

U.S. PATENT DOCUMENTS

| | | |
|---|---|---|
| 4,756,617 | 7/1988 | Cain et al. . |
| 4,767,208 | 8/1988 | Cain et al. . |
| 4,790,402 | 12/1988 | Field et al. ............................. 180/169 |
| 4,805,086 | 2/1989 | Nielsen et al. . |
| 4,807,131 | 2/1989 | Clegg . |
| 4,829,418 | 5/1989 | Nielsen et al. . |
| 4,830,489 | 5/1989 | Cain et al. . |
| 4,888,890 | 12/1989 | Studebaker et al. . |
| 4,895,440 | 1/1990 | Cain et al. . |
| 4,914,593 | 4/1990 | Middleton et al. . |
| 4,924,374 | 5/1990 | Middleton et al. . |
| 4,926,948 | 5/1990 | Davidson et al. . |
| 5,076,690 | 12/1991 | deVos et al. . |
| 5,078,215 | 1/1992 | Nau . |
| 5,107,932 | 4/1992 | Zachman et al. . |
| 5,137,354 | 8/1992 | deVos et al. . |
| 5,141,307 | 8/1992 | Bennett et al. . |
| 5,184,293 | 2/1993 | Middleton et al. . |
| 5,235,511 | 8/1993 | Middleton et al. . |
| 5,243,398 | 9/1993 | Nielsen . |
| 5,251,133 | 10/1993 | Kamimura et al. . |
| 5,327,345 | 7/1994 | Nielsen et al. . |
| 5,334,987 | 8/1994 | Teach . |
| 5,375,663 | 12/1994 | Teach . |
| 5,465,493 | 11/1995 | Sobottke et al. . |
| 5,467,273 | 11/1995 | Faibish et al. . |
| 5,477,459 | 12/1995 | Clegg et al. . |
| 5,519,620 | 5/1996 | Talbot et al. . |
| 5,559,725 | 9/1996 | Nielson et al. . |
| 5,572,809 | 11/1996 | Steenwyk et al. . |
| 5,583,685 | 12/1996 | Ohtomo et al. . |
| 5,621,531 | 4/1997 | Van Andel et al. . |
| 5,683,220 | 11/1997 | Ohtomo et al. . |
| 5,689,330 | 11/1997 | Gerard et al. . |
| 5,711,022 | 1/1998 | Steenwyk . |
| 5,742,069 | 4/1998 | Steenwyk et al. . |
| 5,751,459 | 5/1998 | Ohtomo et al. . |
| 5,764,511 | 6/1998 | Henderson . |
| 5,771,978 | 6/1998 | Davidson et al. ....................... 172/4.5 |

FOREIGN PATENT DOCUMENTS

| | | |
|---|---|---|
| 0452974 | 10/1991 | European Pat. Off. . |
| 0452975 | 10/1991 | European Pat. Off. . |
| 0457548 | 11/1991 | European Pat. Off. . |
| 0223043 | 1/1992 | European Pat. Off. . |
| 0468677 | 1/1992 | European Pat. Off. . |
| 0501616 | 9/1992 | European Pat. Off. . |
| 0219767 | 12/1992 | European Pat. Off. . |
| 0542015 | 5/1993 | European Pat. Off. . |
| 0349132 | 8/1993 | European Pat. Off. . |
| 0346044 | 1/1994 | European Pat. Off. . |
| 0358368 | 4/1994 | European Pat. Off. . |
| 0426287 | 4/1994 | European Pat. Off. . |
| 0452974 | 1/1995 | European Pat. Off. . |
| 0452975 | 12/1995 | European Pat. Off. . |
| 0468677 | 5/1996 | European Pat. Off. . |
| 0457548 | 7/1996 | European Pat. Off. . |

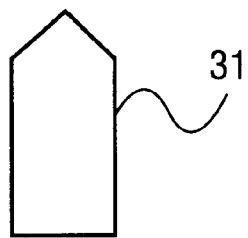
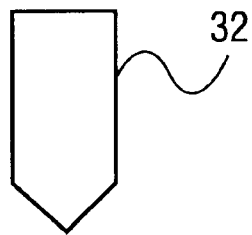
FIG. 6A
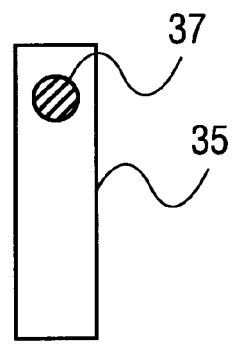
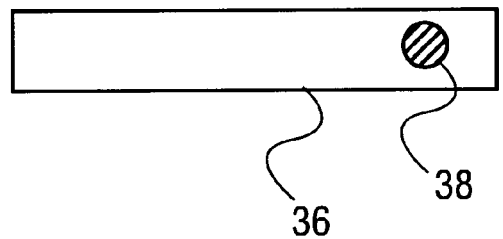
FIG. 6B

METHOD AND APPARATUS FOR ACCURATELY POSITIONING A TOOL ON A MOBILE MACHINE USING ON-BOARD LASER AND POSITIONING SYSTEM

FIELD OF THE INVENTION

The present invention pertains to the field of guidance and control systems for mobile machines. More particularly, the present invention relates to techniques for accurately positioning a tool on a mobile machine.

BACKGROUND OF THE INVENTION

Various technologies have been developed to accurately position a tool on a mobile machine. These technologies are useful in applications such as construction, mining, and other industries, in which it may be necessary to achieve very tight tolerances. On a construction site, for example, it may be necessary to add or remove earth from a given location to accurately provide a specified design elevation, which may be different from the initial surface elevation. A machine such as an excavator, grader, or bulldozer equipped with a shovel, bucket, blade, or other appropriate tool is typically used. Hence, the tool must be positioned accurately to achieve the required tolerances.

Some machine control systems rely upon a stationary rotating laser or a robotic total station to assist in accurately positioning the tool. However, such systems are limited to operation with only one machine at a time. In addition, laser based systems are limited by line of sight. Thus, obstructions in the work area, such as other machines, may impair operation of the system. Further, many such systems are effective only when used on very level terrain. Hence, what is needed is a system for accurately positioning a tool on a mobile machine, which overcomes these and other disadvantages.

SUMMARY OF THE INVENTION

The present invention includes a method and apparatus for positioning a tool on a mobile unit. In one embodiment, the method comprises using a positioning system on-board the mobile unit to determine the location of the mobile unit. A laser beam is transmitted from a laser on-board the mobile unit to a stationary reference point, and a positional adjustment for the tool is determined based on the location of the mobile unit and a parameter associated with the laser beam.

In another embodiment, the method includes using a positioning system onboard the mobile unit to determine the location of the mobile unit, and then using one of multiple selectable stationary reference points and the location of the mobile unit to determine a positional adjustment for the tool.

In yet another embodiment, the method comprises storing a terrain model of an area, on-board the mobile unit, including data indicating the locations of each of multiple fixed reference points. An on-board positioning system is used to determine the location of the mobile unit, and one of the fixed reference points is selected. A laser beam is then transmitted by an on-board laser at the selected reference point. A displacement is computed based on a parameter associated with the laser beam and the selected reference point, and a positional adjustment for the tool is computed based on the computed displacement.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 6A and 6B illustrate two embodiments of a visual indicator for enabling an operator of the machine to accurately position the tool.

DETAILED DESCRIPTION

A method and apparatus for accurately positioning a tool on a mobile machine are described. In brief, the method and apparatus are characterized as follows. A satellite positioning system (SPS) receiver system mounted on mobile machine provides horizontal and vertical position information to an on-board processor. A set of fixed reference points, each with a reflective target, is distributed about a work area. The exact location of each reference point and the height of the reflective target are known and stored within a digital terrain model (DTM) stored on-board the machine. A scanning laser and associated photosensor and a robotic total station are shock-mounted to the machine. The SPS receiver, scanning laser, and total station are all interfaced to the on-board processor. A positionable tool on-board the machine is connected to a standard control system, which is also interfaced to the on-board processor.

In operation, the on-board processor receives positions from the SPS receiver as the machine moves about the work area. The processor determines x, y, and z position coordinates relative to a design stored in the DTM. The processor computes range, bearing, and azimuth to the nearest reflector target based upon the DTM. The total station locates the reflector based on this data, and the servo drive of the scanning laser aims the laser beam to hit the reflector and the photosensor. Lock is maintained on the reflector by action of the servo drive adjusting the aim of the scanning laser. The processor then precisely determines the angle between the laser and the reflector, yielding a highly accurate z (elevation) value corresponding to a displacement between the tool and the design elevation. This z value is then used by the processor to compute an adjustment for the tool. The tool is then adjusted either automatically via the control system according to the computed adjustment, or by an operator using an operator-perceivable indication of the adjustment. The on-board processor senses when the current reflector target is out of range or when an obstruction, such as another machine, is present, and automatically controls the servo drive to enable the total station and scanning laser to locate the next closest or available target.

As will be apparent from this description, this system and technique provide several advantages. First, the system is not limited to use with a single machine. Any machine which has such an on-board system can make use of the fixed reference points to accurately position a tool. Also, the use of multiple fixed reference points, rather than a single reference point, enables the system to operate effectively even when obstructions are present in the work area. Other advantages will be apparent from the description which follows.

Figure 1:
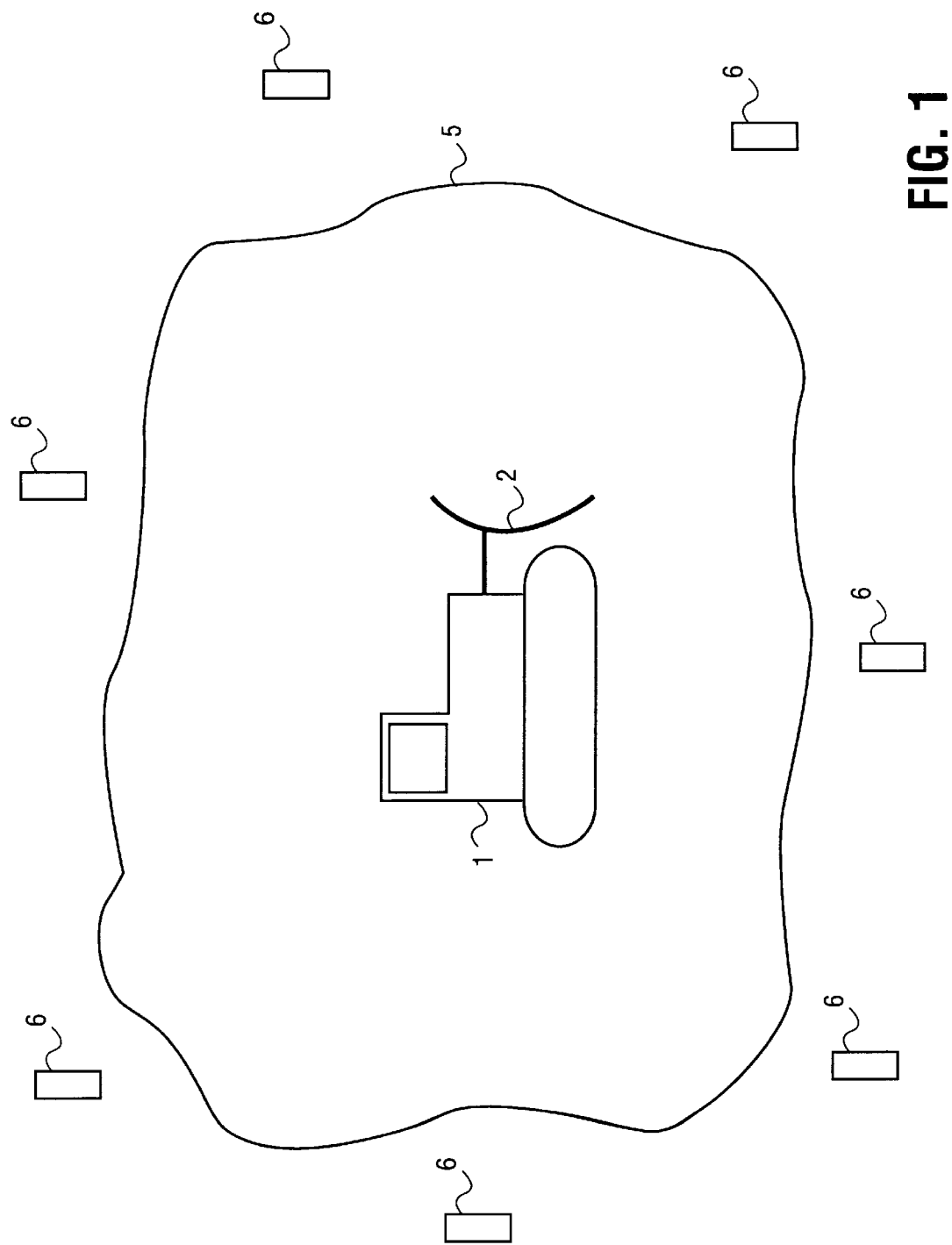
FIG. 1 illustrates an environment including a number of stationary reference points positioned about a mobile machine operating in a work area.

Referring now to FIG. 1, a mobile machine 1 located within a work area 5 and having a positionable tool 2 is illustrated. The mobile machine 1 may be, for example, an excavator, a grader, or a bulldozer, and the tool 2 may be, for example, a shovel, bucket, blade, or other tool commonly found on such machines. A number of poles 6 are positioned around the work area 5 at fixed positions as reference points, each of which includes an optical reflector. The exact horizontal and vertical (x, y, z) coordinates of each of the poles 6 and the height of their reflectors are known and stored within a digital terrain model (DTM) maintained in an on-board system in the machine 1. The DTM includes data representing specified design elevation (z) coordinates for various (x,y) coordinates within the work area 5.

Figure 2:
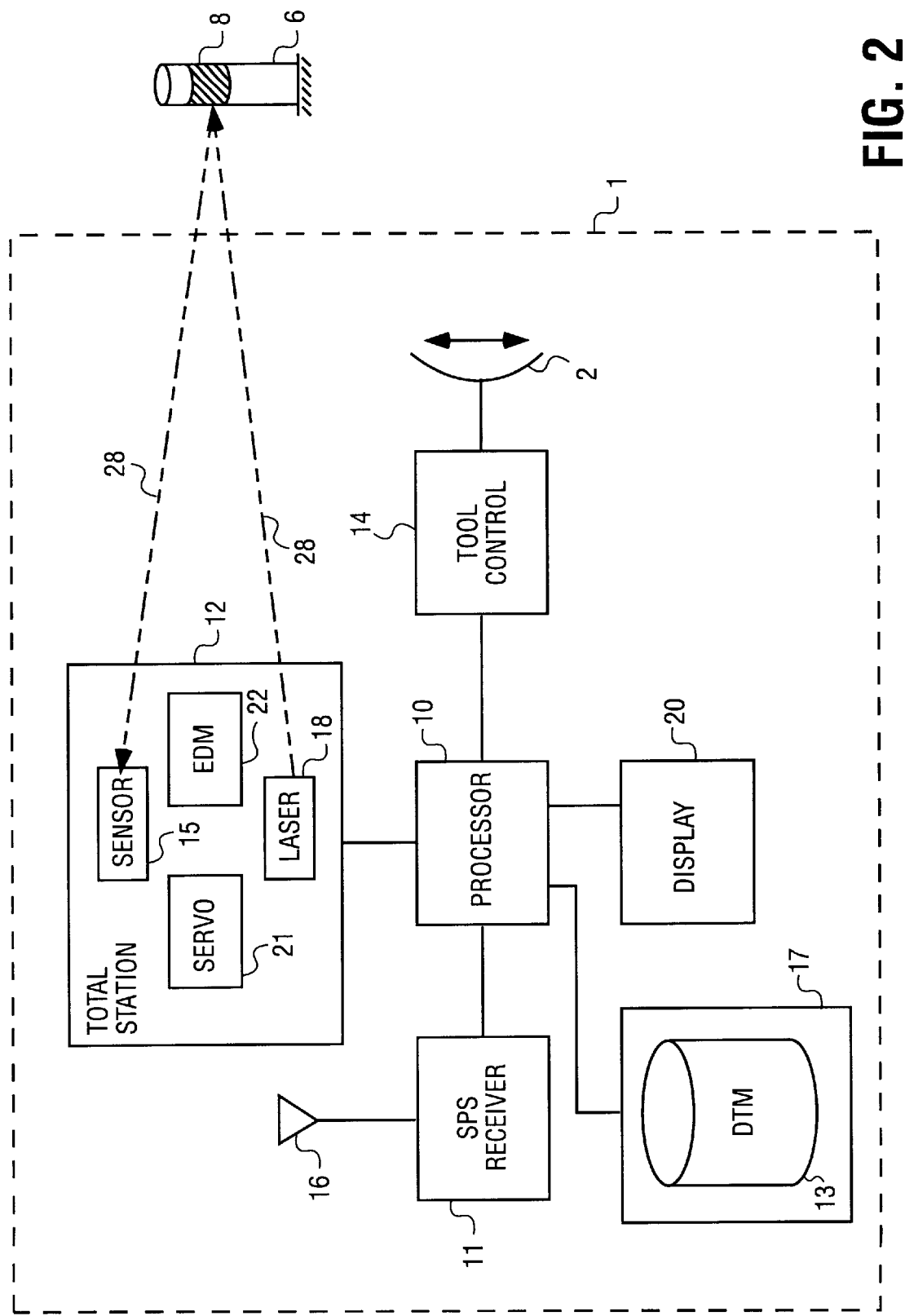
FIG. 2 illustrates an embodiment of an on-board system for accurately positioning the tool using the stationary reference points.

FIG. 2 shows an embodiment of the on-board system in the machine 1, which is used to implement the technique of the present invention. As illustrated, the on-board system includes a processor 10, which controls the overall operation of the on-board system. The processor 10 may be, or may include, any device suitable for controlling and coordinating the operations described herein, such as an appropriately programmed general or special purpose microprocessor, digital signal processor (DSP), microcontroller, an application-specific integrated circuit (ASIC), or the like. Coupled to the processor 10 are: a satellite positioning system (SPS) receiver 11, which is coupled to a suitable antenna 16; an optically-based electronic distance measurement (EDM) instrument 22 (hereinafter "EDM 22") capable of performing surveying measurements, storage device 17 storing the above-mentioned DTM 13; a tool control system 14, which is coupled to the tool 2, for controlling movement of the tool 2; a photosensor 15, a scanning laser 18 and associated photosensor 15; and a servo drive 21 for providing movement of the scanning laser 15 and the EDM instrument 22.

The scanning laser 18, photosensor 15, and EDM 22 are preferably shock mounted to the machine 1 to reduce vibration. In the illustrated embodiment, the scanning laser 18, sensor 15, EDM 22, and servo mechanism 21 are integral components of a robotic total station 12. Robotic total stations equipped with scanning lasers are currently commercially available. In other embodiments, however, some or all of these components may be implemented as independent units, rather than within a total station; in that case, EDM 22 alone may be a robotic total station or a similar device.

In one embodiment, SPS receiver 11 is a Global Positioning System (GPS) receiver. GPS receivers are available from a variety of suppliers, including Trimble Navigation Ltd., of Sunnyvale, Calif. In other embodiments, SPS receiver 11 is a receiver based on any other high accuracy positioning system, such as the Global Navigation System (GLONASS), established by the former Soviet Union. It is also contemplated that in alternative embodiments, SPS receiver 11 may be replaced with appropriate elements of a positioning system that is not satellite based, such as a pseudolite based positioning system or an inertial navigation system (INS).

The tool control system 14 is a standard control system for controlling movement of a tool on a mobile machine, such as currently available on the market. Tool control system 14 may include appropriate actuators and/or servo mechanisms for providing movement of the tool 2, as well as an appropriately programmed general or special purpose microprocessor, digital signal processor (DSP), microcontroller, an application-specific integrated circuit (ASIC), or the like. Storage device 17 may be any device suitable for storing a volume of data sufficient to embody a DTM, such as any form of mass storage device (e.g., magnetic or optical disk), random access memory (RAM), read-only memory (ROM), flash memory, or a combination of such devices. Display device 20 may be a cathode ray tube (CRT), liquid crystal display (LCD) or the like, or a more simple type of display such as one or more light-emitting diodes (LEDs), light bulbs, etc. Particular embodiments of display device 20 are discussed below.

Figure 3:
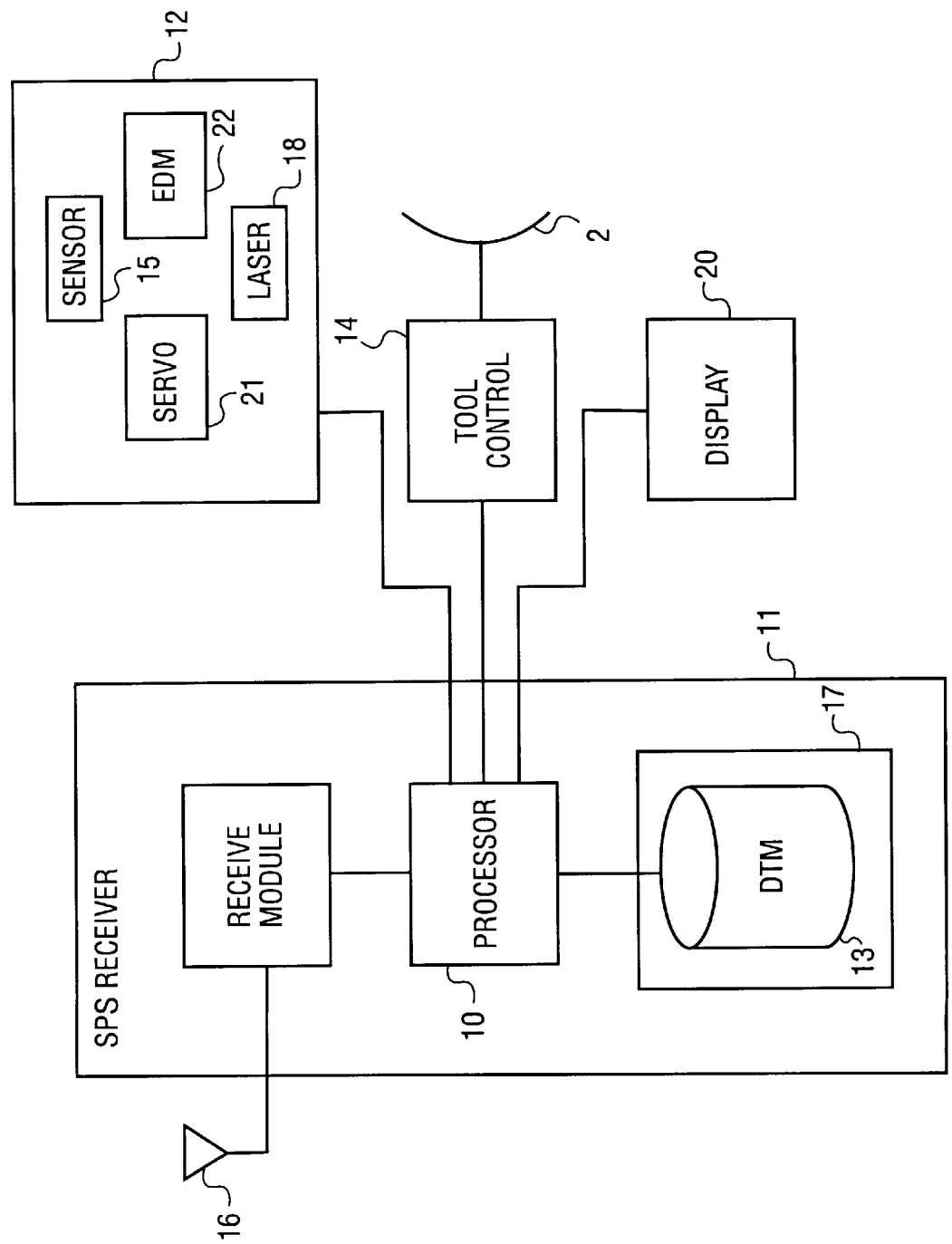
FIG. 3 illustrates an embodiment of the on-board system in which the satellite positioning system (SPS) receiver includes the system processor and a digital terrain model (DTM).

As illustrated in FIG. 3, in some embodiments the SPS receiver system 11 may incorporate storage device 17, which stores the DTM 13. In addition, some or all of the functionality of processor 10 may be implemented by a processor within the SPS receiver 11, as illustrated. As is well known, GPS receivers conventionally include a microprocessor or other similar control circuitry, which may be adapted for this purpose. Such embodiments, therefore, may reduce the need for data storage, processor elements, or both, in the on-board system. Other variations on the on-board system are possible, in addition to those described above.

The operation of the on-board system will now be described. It should first be noted that, although GPS technology is capable of providing high accuracy and precision, current GPS technology generally is not capable of providing z (vertical) position accuracy better than about two centimeters in real time. However, this degree of accuracy or better accuracy may be required in the vertical direction for certain applications, particularly in construction and mining. Without high z accuracy, it may be difficult to position the tool 2 with sufficient accuracy. Hence, in the on-board system, the SPS receiver 11 is used to determine the current (x,y,z) coordinates of the machine 1. The on-board scanning laser 18 then enables the current z coordinate of the machine 1 to be determined with greater accuracy, to allow accurate positioning of the tool 2.

Figure 4:
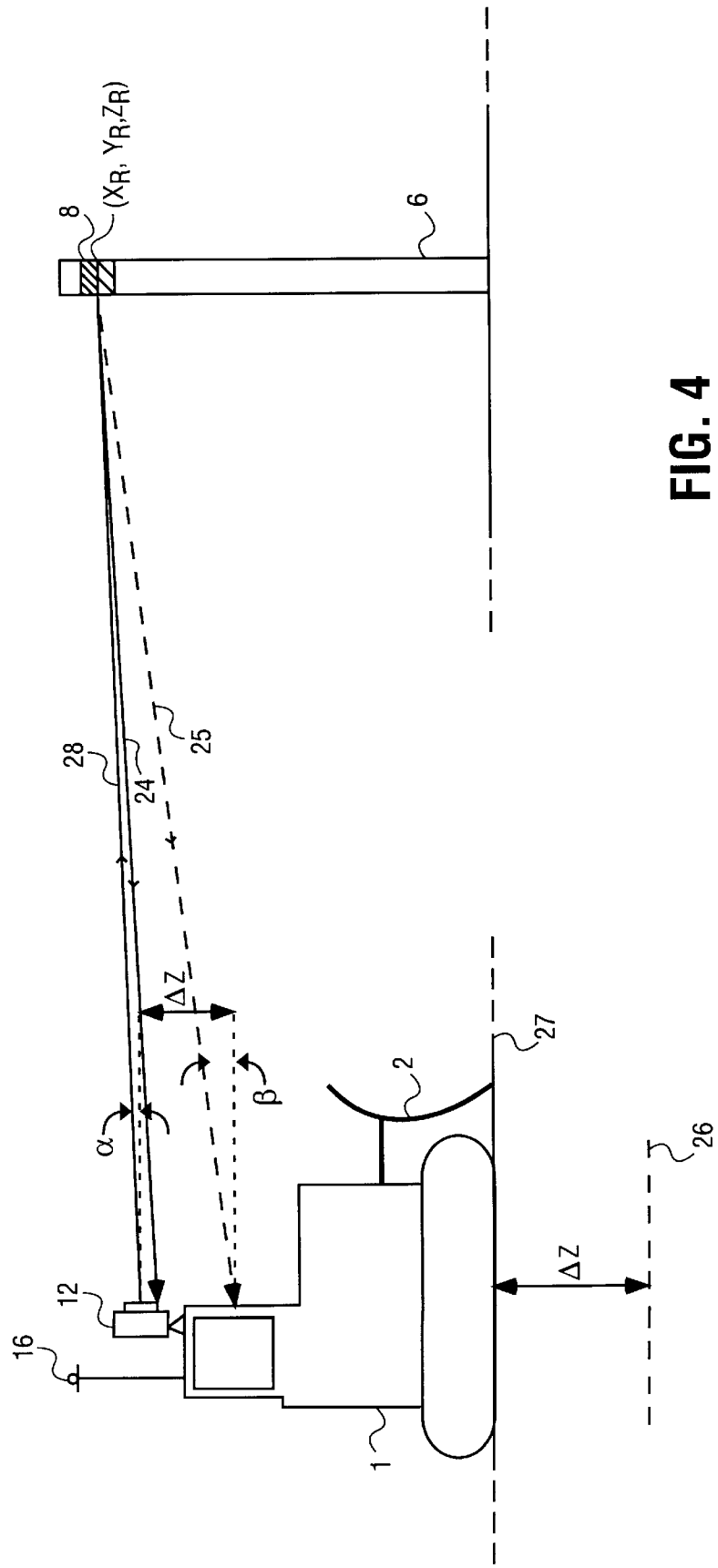
FIG. 4 schematically illustrates a technique for computing a displacement value to determine an adjustment amount for the tool.
Figure 5:
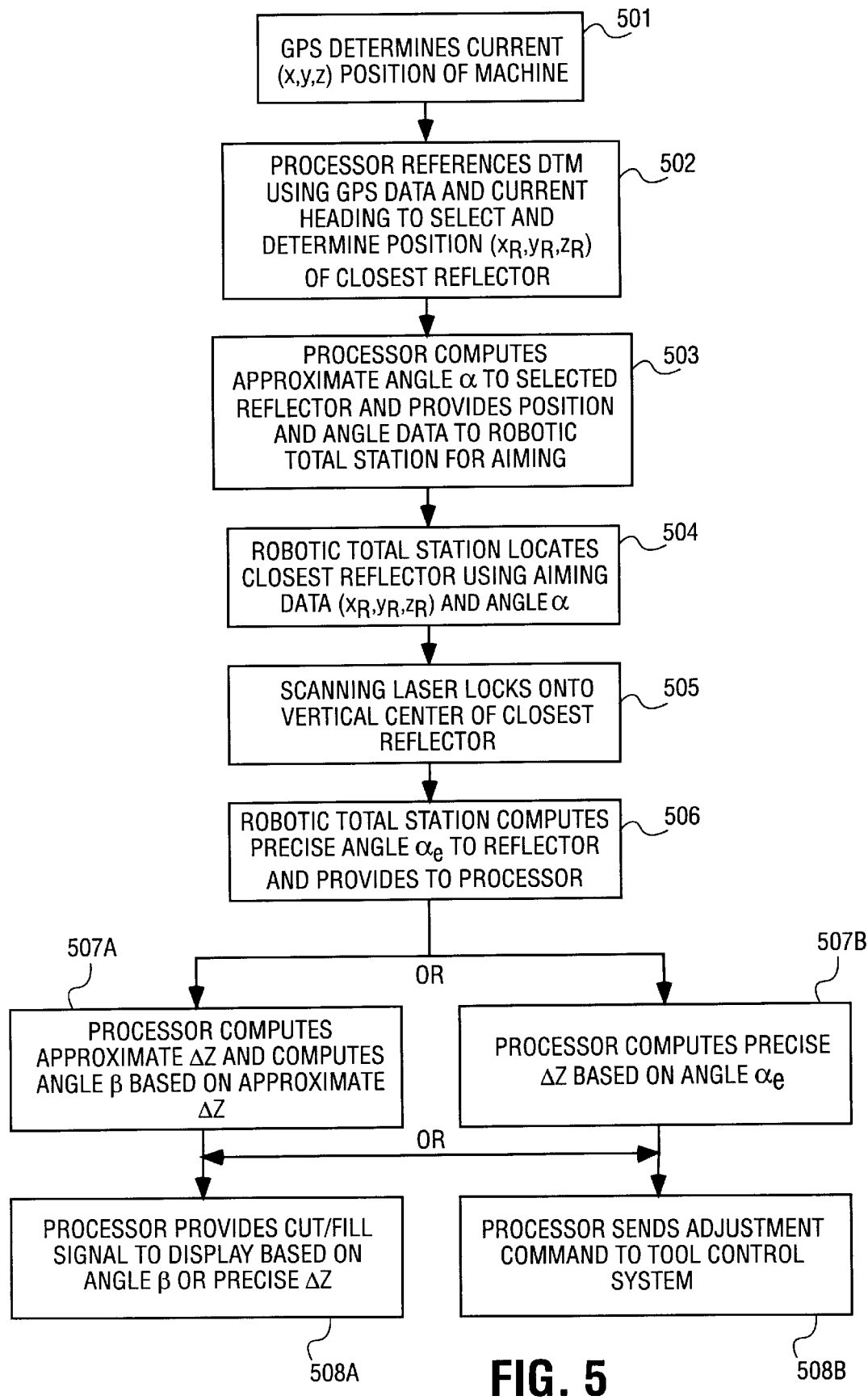
FIG. 5 is a flow diagram illustrating a routine for positioning the tool using the technique of FIG. 4.

Refer now to FIGS. 4 and 5. FIG. 4 schematically illustrates a technique for determining an adjustment for the tool 2. FIG. 5 is a flow diagram illustrating a routine for positioning the tool 2, using the technique of FIG. 4. The routine may be repeated continually or as necessary to accurately maintain the position of the tool 2. As the machine 1 operates within the work area 5, the SPS receiver 11 determines the current (x,y,z) position coordinates of the machine 1 at block 501. At block 502, the processor 10 uses the DTM 13, the (x,y,z) position coordinates of the machine 1, and the current heading of the machine (as indicated by a compass, gyroscope, multiple GPS antennas, or other suitable sensor), to select the "closest" pole 6 to the machine 1 and determines its position coordinates. In this context, the "closest" pole is the nearest pole to the machine 1 that is within line of sight of the EDM 22 and the laser 18 (i.e., unobstructed) and/or the bearing to which is within a prescribed range of bearings. If the nearest pole 6 is not within line of sight, for example, the processor 10 will automatically select another pole 6. As noted above, an optical reflector 8 is mounted on each reference pole 6. Also as noted above, the exact coordinates $(x_R, y_R, z_R)$ of each reflector 8 are stored in the DTM 13.

Hence, at block 503 the processor 10 computes the range, bearing, and azimuth angle α (the angle between the laser beam and a horizontal plane—see FIG. 4) to the selected reflector 8, based on the aforementioned data, and provides the range, bearing, and azimuth data to the total station 12 with appropriate control signals. Note that the positions on the machine 1 of the SPS antenna 16, laser 18, EDM 22, and the mounting of the tool 2, relative to ground level and to each other, are known and stored in the on-board system in appropriate form. Note also that the mounting configuration of the SPS receiver 11, antenna 16, and total station 12 is not limited to the configuration shown in FIG. 4, which is only one example of such a configuration.

Based on the aforementioned data and control signals provided by the processor 10, at block 504 the EDM 22 optically acquires (locates) the selected reflector 8. The scanning laser 18 then achieves a "lock" on the reflector 8 at block 505, based on feedback from the photosensor 15. "Lock" is considered to be the state in which the laser beam 28 is aimed so as to be reflected by the reflector 8 back to the photosensor 15, as shown in FIG. 2. Movement of the EDM 22 and the scanning laser 18 is provided by the servo drive 21 for purposes of acquiring and locking onto the reflector. Note that the servo drive 21 may be embodied as separate servo drive elements to provide independent movement of the laser 18 and the EDM 22.

The reflector 8 on each pole 6 may be composed of an array of reflective elements varying in reflectance intensity in the vertical direction. This configuration enables a scanning laser to identify and lock onto the vertical center of the reflector 8 based on the intensity of the reflected beam. The reflector 8 further may circumscribe the pole 6, to allow a scanning laser to lock onto it from any angle in the horizontal plane.

Once the laser 18 has locked onto the reflector 8, at block 506 the total station 12 computes and provides to processor 10 the precise azimuth angle $\alpha_e$ (not shown) of the laser beam 28. The precise angle $\alpha_e$ is a more accurate determination of the azimuth angle than the angle $\alpha$ used by the EDM 22 device to locate the reflector 8. The angle $\alpha_e$ is derived by reading the new vertical angle of the servo of the robotic total station 12.

Next, the processor 10 uses the angle $\alpha_e$ to determine an adjustment for the tool 2. The manner in which this is accomplished may vary, depending upon the embodiment, or depending upon the particular execution path being executed within a given embodiment. For example, in some embodiments, the processor 10 may both compute the adjustment and automatically implement the adjustment—in that case, the on-board system operates in a fully automatic mode. In other embodiments, the processor 10 may simply provide the operator of the machine 1 with an indication (visual, audible, or otherwise) of the required adjustment to guide the operator in manually making the adjustment—in that case, the on-board system operates in a guidance only mode. Still in other embodiments, the on-board system may be switchable between the automatic mode and the guidance only mode. In such embodiments, the system may switch from manual mode to automatic mode based on a predefined criterion, such as how close the machine is to the design elevation. For example, the system may be operated in manual mode while performing rough cuts and then automatically transition to automatic mode to control fine grading upon the system's detecting a predefined distance between the current elevation and the design elevation.

Hence, referring still to FIGS. 4 and 5, after block 506 the process may continue to either block 507A or 507B, depending upon the embodiment, or depending upon the execution path within a given embodiment. At block 507A, the processor 10 computes the displacement $\Delta z$ between the current elevation of the machine 1 and the design elevation for the current location, based on the SPS data and the DTM. The processor 10 then computes an angle $\beta$ (FIG. 4), which is defined as the angle, from a horizontal plane, between the return path 25 the laser beam would take if it were to strike the photosensor 15 exactly $\Delta z$ below the point at which the laser beam 28 left the laser 18. As noted above, the exact mounting location of the laser 18 is known and can be used for this computation. Note that the hypothetical return path 25 is not to be confused with the actual return path 24 of the laser beam 28, although these paths will be the same if the current elevation equals the design elevation.

In another embodiment, or in another execution path, the process proceeds to block 507B after block 506. At block 507B, the processor 10 computes a more precise value of $\Delta z$ based on the computed angle $\alpha_e$, using simple trigonometric calculation.

After block 507A or block 507B, the routine proceeds to either block 508A or 508B, depending on either the embodiment or the execution path. At bock 508A, the processor 10 provides a "cut" or "fill" command, as appropriate, to an indicator device, such as display device 20, based on the angle $\beta$ or the precise $\Delta z$ value. For example, if block 508A follows block 507A, then the processor 10 provides a cut/fill command if angle $\beta$ does not equal angle $\alpha_e$. Alternatively, if block 508A follows block 507B, then the processor 10 provides a cut/fill command if the precise $\Delta z$ value is non-zero.

At block 508B, the processor 10 uses simple trigonometric computation to compute the required amount of adjustment for the tool 2 and provides an appropriate adjustment command to the tool control system 14, based on the computed adjustment amount. The adjustment amount can be computed based on the precise $\Delta z$ value or the angle $\beta$, as appropriate. For example, the adjustment amount can be easily computed knowing the precise $\Delta z$ and the exact mounting position of the tool 2 relative to ground level. The tool control system 14 then responds by adjusting the position of the tool 2 vertically by the computed adjustment amount.

Numerous variations upon the above-described routine are possible within the scope of the present invention. Further, the routine may be repeated continually or as necessary to accurately maintain the position of the tool 2. If at any time the selected reflector 8 goes out of range, becomes obstructed from view, or otherwise becomes unavailable, the next closest available reflector is identified by the processor 10, and the routine is repeated using that reflector. Hence, using the foregoing technique, the tool 2 can be positioned accurately and automatically by the on-board system.

As noted above, it may be desirable to allow the operator to control the positioning of the tool 2 manually, using feedback from the on-board system. Hence, a visual, audible, or other type of indicator may be used to guide the operator in doing so. FIGS. 6A and 6B illustrate simple examples of visual indicators which may be used for this purpose. Such visual indicators may be embodied as the display device 20 (FIGS. 2 and 3) or as graphical representations provided by the display device 20. FIG. 6A shows a visual indicator including segments 31 and 32, which light up appropriately to indicate that the operator should adjust the tool up or down, respectively. FIG. 6B illustrates a visual indicator for an embodiment which allows two-dimensional positioning of the tool. The indicator of FIG. 6B includes a vertical indicator 35 and a horizontal indicator 36 containing beads 37 and 38, respectively, to indicate to the operator how much to adjust the tool up/down or left/right, respectively.

Thus, a method and apparatus for accurately positioning a tool on a mobile machine have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of positioning a tool on a mobile unit, the method comprising:
   storing on-board the mobile unit data representing the locations of a plurality of stationary reference points;
   using a positioning system on-board the mobile unit to determine the location of the mobile unit;
   selecting one of the stationary reference points based on the location of the mobile unit and the data representing the locations of the stationary reference points;
   transmitting a laser beam from a laser on-board the mobile unit to the selected stationary reference point; and
   determining a positional adjustment for the tool based on the location of the mobile unit and a parameter associated with the laser beam.

2. A method as recited in claim 1, wherein said selecting comprises automatically selecting the stationary reference point.

3. A method as recited in claim 2, wherein said using a positioning system comprises using a satellite positioning system receiver on-board the mobile unit.

4. A method as recited in claim 2, wherein said determining a positional adjustment for the tool comprises using a digital terrain model stored on-board the mobile unit.

5. A method as recited in claim 4, wherein the digital terrain model includes the data representing the locations of the plurality of selectable reference points.

6. A method of positioning a tool on a mobile unit during operation of the mobile unit within a work area, the method comprising:
   storing on-board the mobile unit a terrain model of the work area, the terrain model including data on the locations of each of a plurality of selectable reference points;
   using a positioning system on-board the mobile unit to determine the location of the mobile unit; and
   using one of the plurality of selectable stationary reference points and the location of the mobile unit to determine a positional adjustment for the tool.

7. A method as recited in claim 6, wherein said using one of the plurality of stationary reference points to determine the positional adjustment for the tool comprises:
   transmitting a laser beam from a laser on-board the mobile unit at said one of the plurality of stationary reference points; and
   determining the positional adjustment of the tool based on a measurement associated with said transmitting.

8. A method as recited in claim 7, wherein said using a positioning system comprises using a satellite positioning system receiver on-board the mobile unit.

9. A method of accurately positioning a tool on a mobile unit, the method comprising:
   storing on-board the mobile unit a terrain model of an area including data indicating the locations of each of a plurality of fixed reference points;
   using an on-board positioning system to determine the location of the mobile unit;
   selecting one of the plurality of fixed reference points based on the terrain model and the location of the mobile unit;
   aiming a laser beam generated by an on-board laser at the selected reference point;
   computing a displacement based on a parameter associated with the laser beam and the selected reference point; and
   determining a positional adjustment for the tool based on the computed displacement.

10. A method as recited in claim 9, further comprising automatically repositioning the tool based on the computed displacement.

11. A method as recited in claim 9, further comprising generating a visual indication of the computed displacement to an operator of the tool.

12. A method as recited in claim 9, further comprising storing design elevations for a plurality of locations within the area, and wherein said computing the displacement comprises computing the displacement based on the measured parameter and a design elevation associated with the location of the mobile unit.

13. A method as recited in claim 11, wherein the parameter comprises a measured angle between the laser beam and the selected reference point.

14. A method as recited in claim 9, wherein said aiming comprises aiming the laser beam at the selected reference point based on data in the terrain map indicating the location of the selected reference point.

15. A method as recited in claim 9, wherein said using a precise positioning system comprises using a satellite positioning system receiver.

16. A method as recited in claim 9, further comprising using a survey measurement unit to locate the selected reference point.

17. A method as recited in claim 16, wherein said using the survey measurement unit comprises using a robotic total station.

18. A method of automatically positioning a tool on a mobile machine operating within an area, the method comprising:
   using an on-board satellite positioning system location device to determine a horizontal location of the machine;
   providing an on-board digital terrain model (DTM), the DTM indicating the locations of each of a plurality of stationary reflectors located about the area and design elevations for a plurality of locations within the area;
   selecting and determining the location of one of the plurality of stationary reflectors based on the horizontal location of the machine and the DTM, including determining an approximate elevation of the selected reflector;
   using an on-board total station to locate the selected reflector based on the determined location;
   using an on-board scanning laser to lock onto the selected reflector based on the approximate elevation;
   computing an angle between the laser and the selected reflector;
   computing an adjustment for the tool based on the angle and a design elevation from the DTM corresponding to the location of the machine; and
   adjusting the position of the tool based on the computed adjustment.

19. An on-board system for enabling positioning of an adjustable tool in a mobile unit, the on-board system comprising:
   storage means for storing data representing the locations of a plurality of stationary reference points;
   a positioning system to determine the location of the mobile unit;
   a laser unit to generate a laser beam;
   selection means for selecting a stationary reference point of the plurality of stationary reference points, based on said data and the location of the mobile unit;
   aiming means for aiming the laser beam at the selected stationary reference point;
   means for determining a parameter associated with the laser beam and the selected stationary reference point; and
   means for determining a displacement of the tool based on the parameter.

20. A system as recited in claim 19, wherein the positioning system comprises a satellite positioning system receiver.

21. A system as recited in claim 19, further comprising a survey measurement unit to locate the selected stationary reference point.

22. A system as recited in claim 21, wherein the survey measurement unit comprises a robotic total station.

23. A system as recited in claim 19, further comprising means for automatically repositioning the tool based on the displacement.

24. A system as recited in claim 19, further comprising means for generating an indication of the displacement to an operator of the tool.

25. A system as recited in claim 19, wherein the storage means comprises means for storing a terrain model of an area in which the mobile unit is to operate.

26. A system as recited in claim 25, wherein the positioning system comprises a satellite positioning system receiver, and wherein the terrain model is stored within the satellite positioning system receiver.

27. A system as recited in claim 25, wherein the storage means comprises means for storing design coordinates for a plurality of locations within the area, and wherein the means for computing the displacement comprises means for computing the displacement based on the measured parameter and a design coordinate associated with the location of the mobile unit.

28. A system as recited in claim 25, wherein the terrain map includes the data representing the locations of the plurality of stationary reference points.

29. A system as recited in claim 19, wherein the parameter comprises an angle between the laser beam and the stationary reference point.

30. A system as recited in claim 19, wherein the means for computing a displacement comprises means for computing a vertical displacement based on the design coordinate associated with the location of the mobile unit.

31. A system as recited in claim 19, wherein the laser unit comprises a scanning laser; and wherein each of the stationary reference points comprises an optical reflector.

32. In a mobile unit having a tool, an on-board system for enabling accurate positioning of the tool, the on-board system comprising:
   a precise positioning system configured to determine the location of the mobile unit;
   a laser unit configured to generate a laser beam;
   storage means for storing a terrain model of an area including data indicating the locations of each of a plurality of fixed reference points;
   selection means for selecting one of the plurality of fixed reference points;
   aiming means for directing the laser beam to the selected reference point;
   means for computing a displacement based on a measured parameter associated with the laser beam and the selected reference point; and
   means for determining a positional adjustment for the tool based on the computed displacement.

33. A system as recited in claim 32, wherein the precise positioning system includes the terrain model.

34. A system as recited in claim 32, wherein the selection means comprises means for selecting said one of the plurality of reference points based on the terrain model and the location of the mobile unit.

35. A system as recited in claim 32, wherein the storage means comprises means for storing design coordinates for a plurality of locations within the area, and wherein the means for computing the displacement comprises means for computing the displacement based on the measured parameter and a design coordinate associated with the location of the mobile unit.

36. A system as recited in claim 32, wherein the measured parameter comprises an angle between the laser beam and the selected reference point.

37. A system as recited in claim 32, wherein the means for computing a displacement comprises means for computing a vertical displacement.

38. A system as recited in claim 32, wherein the aiming means comprises means for aiming the laser beam at the selected reference point based on data in the terrain map indicating the location of the selected reference point.

39. A system as recited in claim 48, wherein the laser unit comprises a scanning laser, and wherein each of the fixed reference points comprises an optical reflector.

40. A system as recited in claim 32, wherein the precise positioning system comprises a satellite positioning system receiver.

41. A system as recited in claim 32, wherein the aiming means comprises a survey measurement unit.

42. A system as recited in claim 41, wherein the survey measurement unit comprises a total station.

43. An on-board system in a mobile unit having a tool, the system for enabling accurate positioning of the tool, the system comprising:
   a satellite positioning system unit configured to determine a horizontal location of the mobile unit;
   a survey measurement unit;
   a laser unit;
   a storage unit having stored therein a terrain model, including data indicating the locations of each of a plurality of reflectors positioned about an area; and
   a processor configured to select and determine the location of one of the plurality of reflectors based on the terrain model;
   wherein the survey measurement unit is configured to locate the selected reflector; and
   wherein the processor is further configured to:
      compute an angle between the selected reflector and a laser beam generated by the laser unit;
      compute a positional adjustment for the tool based on the computed angle; and
      output signals for enabling repositioning of the tool based on the computed adjustment.

44. A system as recited in claim 43, wherein the storage unit storing the terrain model is an integral component of the satellite positioning system unit.

45. A system as recited in claim 43, wherein the survey measurement unit comprises a total station.

46. A system as recited in claim 43, wherein the laser unit is an integral component of the total station.

47. A system as recited in claim 43, wherein the processor is configured to select and determine the location of said one of the plurality of reflectors based on the terrain model and the horizontal location of the mobile unit.

48. A system as recited in claim 43, wherein the storage unit further has stored therein design elevations for a plurality of locations within the area, and wherein the processor is configured to compute the positional adjustment for the tool based on the computed angle and a design elevation corresponding to the location of the mobile unit.

49. An on-board system for automatically positioning a tool on a mobile machine operating within an area, the system comprising:

positioning means for determining a precise horizontal location of the machine;

storage means for storing an on-board digital terrain model (DTM), the DTM indicating the locations of each of a plurality of stationary reflectors located about the area and design elevations for a plurality of locations within the area;

means for selecting one of the plurality of stationary reflectors based on the DTM;

means for determining coordinates of the selected stationary reflector, including means for determining an approximate elevation of the selected reflector;

locating means for locating the selected reflector based on the coordinates;

light-emitting means for optically acquiring the selected reflector based on the approximate elevation based on a transmitted light beam;

means for computing an adjustment for the tool based on an angle between the light beam and the selected reflector and a design elevation from the DTM corresponding to the location of the machine; and means for adjusting the position of the tool based on the computed adjustment.

50. A system as recited in claim 49, wherein the locating means comprises a total station.

51. A system as recited in claim 49, wherein the positioning means comprises a satellite positioning system receiver.

52. A system as recited in claim 49, wherein the light-emitting means comprises a laser.

53. A system as recited in claim 49, wherein the means for computing an adjustment for the tool comprises means for computing the adjustment for the tool based on the angle and a design elevation from the DTM corresponding to the location of the machine.

54. An on-board system in a mobile machine having a tool, for enabling accurate positioning of the tool, the system comprising:

a satellite positioning system receiver configured to determine a horizontal location of the machine;

a robotic total station with an integrated a scanning laser;

a storage device having stored therein a digital terrain model (DTM), including data indicating the locations of each of a plurality of stationary reflectors positioned at various locations about an area and design elevations for a plurality of locations within the area;

a tool controller configured to control the position of the tool; and a processor configured to:
    select and determine the location of one of the plurality of stationary reflectors based on the horizontal location of the machine and the DTM, including determining an approximate elevation of the selected reflector; and
    generate a first control signal including an indication of the location and approximate elevation of the selected reflector;

wherein the total station is configured to:
    locate the selected reflector in response to the first control signal; and
    acquire the selected reflector using the scanning laser;

wherein the processor is further configured to:
    compute an angle between the laser and the selected reflector;
    compute an adjustment for the tool based on the angle and a design elevation from the DTM corresponding to the location of the machine; and
    provide the first control signals to the tool controller to cause the tool controller to alter the position of the tool based on the computed adjustment.

* * * * *